US008751618B2

(12) United States Patent
Bhatt et al.

(10) Patent No.: US 8,751,618 B2
(45) Date of Patent: Jun. 10, 2014

(54) METHOD AND SYSTEM FOR MAXIMIZING CONTENT SPREAD IN SOCIAL NETWORK

(75) Inventors: Rushi Prafull Bhatt, Gujarat (IN); Rajeev Rastogi, Karnataka (IN); Vineet Shashikant Chaoji, Karnataka (IN); Sayan Ranu, Goleta, CA (US)

(73) Assignee: Yahoo! Inc., Sunnyvale, CA (US)

( * ) Notice: Subject to any disclaimer, the term of this patent is extended or adjusted under 35 U.S.C. 154(b) by 406 days.

(21) Appl. No.: 13/080,661

(22) Filed: Apr. 6, 2011

(65) Prior Publication Data

US 2012/0259915 A1 Oct. 11, 2012

(51) Int. Cl.
*G06F 15/173* (2006.01)

(52) U.S. Cl.
USPC .......... 709/223; 709/203

(58) Field of Classification Search
USPC .......... 709/204, 203, 217, 219, 223, 224
See application file for complete search history.

(56) References Cited

U.S. PATENT DOCUMENTS

| | | | | |
|---|---|---|---|---|
| 8,190,724 | B2 * | 5/2012 | Norton | 709/223 |
| 2008/0091834 | A1 * | 4/2008 | Norton | 709/229 |
| 2009/0228296 | A1 * | 9/2009 | Ismalon | 705/1 |
| 2011/0035503 | A1 * | 2/2011 | Zaid et al. | 709/228 |
| 2011/0055132 | A1 * | 3/2011 | Mahdian et al. | 706/46 |
| 2011/0202846 | A1 * | 8/2011 | Najork et al. | 715/736 |
| 2011/0295626 | A1 * | 12/2011 | Chen et al. | 705/7.11 |
| 2012/0005238 | A1 * | 1/2012 | Jebara et al. | 707/798 |
| 2012/0203852 | A1 * | 8/2012 | Norton | 709/206 |
| 2012/0278476 | A1 * | 11/2012 | Agrawal et al. | 709/224 |
| 2012/0324012 | A1 * | 12/2012 | Tiu et al. | 709/204 |

* cited by examiner

*Primary Examiner* — Lashonda Jacobs
(74) *Attorney, Agent, or Firm* — Brinks Gilson & Lione

(57) ABSTRACT

A method, a system and a computer program product for maximizing content spread in a social network are provided. Samples of edges are generated from an initial candidate set of edges. Each edge of the samples of edges has a probability value for content flow. Further, a subset of edges is determined from the samples of edges based on gain corresponding to each edge. Also, each node of the subset of edges is having at least one of less than ‘K’ or equal to ‘K’ incoming edges. Further, the probability of each edge, of the subset of edges, may be incremented. Furthermore, a final set of edges may be determined by ensuring ‘K’ incoming edges. The ‘K’ incoming edges may be ensured by removing one or more incoming edges when a number of the incoming edges for a node of the final set is greater than ‘K’ incoming edge.

33 Claims, 4 Drawing Sheets

METHOD AND SYSTEM FOR MAXIMIZING CONTENT SPREAD IN SOCIAL NETWORK

FIELD OF THE INVENTION

Embodiments of the present invention relate generally to the concept of social network, and more specifically, to maximizing content flow in the social network.

BACKGROUND

Social networks are increasingly becoming a means for interacting with one another to disseminate and discover useful content. In popular social networking sites such as Facebook and LinkedIn, users share updates of their activities within their social circle of contacts. The updates typically include recently uploaded photos, comments on photos and news articles, reviews and ratings that the user has assigned to a movie or restaurant, or simply an article or game on the web that the user has liked. Each contact further recursively shares received updates within its own social circle of contacts, and thereby content generated by a user propagates through the network to a wide user population. Thus, social networks enable users to share content at an unprecedented scale, and discover new content of interest to them.

The extent to which a social network spreads content is a key metric that impacts both user engagement and network revenues. As the content spreading increases, the more novel content users end up discovering, and the more value users derive from being part of the social network. This helps to drive up user engagement which in turn leads to improved user retention and audience growth through word-of-mouth recruitment. Furthermore, as users spend more time accessing diverse content in the form of photos, news articles, games etc., there are increased opportunities for monetizing the content via online ads, sale of virtual goods, subscriptions, and so on. Additionally, new "social" ad formats have features that enable sharing, and so a single ad impression can be viewed by thousands of users in the social network. Also, social ads command a much higher price per impression compared to normal online ads depending on how widely they are distributed in the social network. Thus, they can provide significant revenue lifts. Due to such benefits, it is therefore crucial for social networks to maximize the dissemination of interesting content across the entire social graph.

The degree to which content is disseminated within the network depends on the connectivity relationships among network users. Typically, social networking sites like Facebook and LinkedIn already offer "people recommendations" to each user to increase connectivity among the users. The sites recommend a set of people that the user may want to connect with. However, current people recommender implementations on social networking sites are not geared towards increasing content availability. For instance, the "People You May Know" feature on Facebook employs the Friend-of-Friend (FoF) algorithm that recommends friends of a friend with the rationale that a user is very likely to know close friends of his or her friends. Specifically, FoF recommends users in decreasing order of the number of common friends with the user receiving the recommendation.

Existing schemes for recommending connections in social networks are based on the number of common contacts, similarity of user profiles, etc. For example, existing schemes for recommending connections suggest users whose profiles, interests, or updates have substantial overlap with the receiver of the recommendation. However, simply forming connections based on the number of mutual friends or similarity between profiles or posted content may not maximize the amount of content spread in the social network.

Based on the foregoing, there is a need for a method and system for spreading content in the social network and to overcome the abovementioned shortcoming in the field of the present invention.

SUMMARY

To address shortcomings of the prior art, methods, systems and computer program products are provided for spreading content in a social network.

An example of a method for maximizing content spread in a social network is disclosed. The social network includes a set of nodes and a set of edges between one or more nodes of the set of nodes. The method includes executing steps (a) to (d) for performing one or more functionalities to determine a subset of edges relevant for maximizing flow of content in the social network. The steps (a) to (d) includes: (a) generating one or more samples of edges from an initial candidate set of edges. The initial candidate set of edges being the edges between similar users. Each edge acquires a probability value for content flow thereto. (b) computing gain corresponding to each edge of the one or more samples of edges. (c) determining the subset of edges from the one or more samples of edges. The subset of edges being determined based on the gain. Each node corresponding to each edge of the subset of edges having at least one of less than 'K' incoming edges and equal to 'K' incoming edges. (d) Incrementing the probability value of each edge of the subset of edges by a predefined value. The probability value of each edge of the subset of edges is incremented to upgrade the determined subset of edges. The steps (a) to (d) are performed for a predefined number of iterations. Further, the method includes determining a final set of edges 'X' from the upgraded subset of edges. The final set of edges 'X' being determined by ensuring 'K' incoming edges for each node of the upgraded set of edges. The 'K' incoming edges corresponding to the number of recommended connection to the node. The method further includes outputting the final set of edges 'X' to maximize spreading of the content in the social network.

An example of a system for maximizing content spread in a social network. The social network includes a set of nodes and a set of edges between one or more nodes of the set of nodes. The system includes a functioning module configured to perform one or more functionalities to determine a subset of edges relevant for maximizing flow of content in the social network. The functioning module includes a sampling module, a computing module, a determining module, and an incrementing module. The sampling module generates one or more samples of edges from an initial candidate set of edges. The initial candidate set of edges being the edges between similar users. Each edge acquires a probability value for content flow thereto. The computing module is for computing gain corresponding to each edge of the one or more samples of edges. The determining module is configured to determine the subset of edges from the one or more samples of edges. The subset of edges being determined based on the computed gain. Each node corresponding to each edge of the subset of edges having at least one of less than 'K' incoming edges and equal to 'K' incoming edges. Further, the incrementing module configured to increment the probability value of each edge of the subset of edges by a predefined value. The probability value of each edge of the subset of edges is incremented to upgrade the determined subset of edges. Also, the functioning module performs one or more functionalities for a predefined number of iterations. Further, the system includes a rounding module configured to determine a final set of edges 'X' from the upgraded subset of edges. The final set of edges 'X' being determined by ensuring 'K' incoming edges for each node of the upgraded set of edges. Furthermore, the system includes an output module configured to output the final set of edges 'X' to maximize spreading of the content in the social network.

An example of a computer program product for use with a computer. The computer program product comprising a non-transitory computer usable medium having a computer readable program code embodied therein for maximizing content spread in a social network. The computer readable program code when executed performs a method. The method includes executing steps (a) to (d) for performing one or more functionalities to determine a subset of edges relevant for maximizing flow of content in the social network. The steps (a) to (d) include (a) generating one or more samples of edges from an initial candidate set of edges. The initial candidate set of edges being the edges between similar users. Each edge acquires a probability value for content flow thereto. (b) computing gain corresponding to each edge of the one or more samples of edges. (c) determining the subset of edges from the one or more samples of edges. The subset of edges being determined based on the gain. Each node, corresponding to each edge of the subset of edges, is having at least one of less than 'K' incoming edges and equal to 'K' incoming edges. (d) incrementing the probability value of each edge of the subset of edges by a predefined value. The probability value of each edge of the subset of edges is incremented to upgrade the determined subset of edges. The steps (a) to (d) are performed for a predefined number of iterations. Further, the method includes determining a final set of edges 'X' from the upgraded subset of edges. The final set of edges 'X' being determined by ensuring 'K' incoming edges for each node of the upgraded set of edges. The method further includes outputting the final set of edges 'X' to maximize spreading of the content in the social network.

Advantageously, the present disclosure may recommend connections in a social network with the explicit objective of maximizing content spread in the network. Further, such content maximization problem is NP-hard and non-submodular. The absence of sub-modularity arises from the fact that the graph structure dynamically changes as new recommendations get accepted by users, when the recommendations are provided to the users. Also, the present disclosure imposes per-node constraints on the maximum number of new links as opposed to a global constraint on the number of selected nodes as in the influence maximization problem. Simulation results on realistic graphs may demonstrate the superiority of our approach in comparison with commonly accepted heuristics.

The features described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

Figure 1:
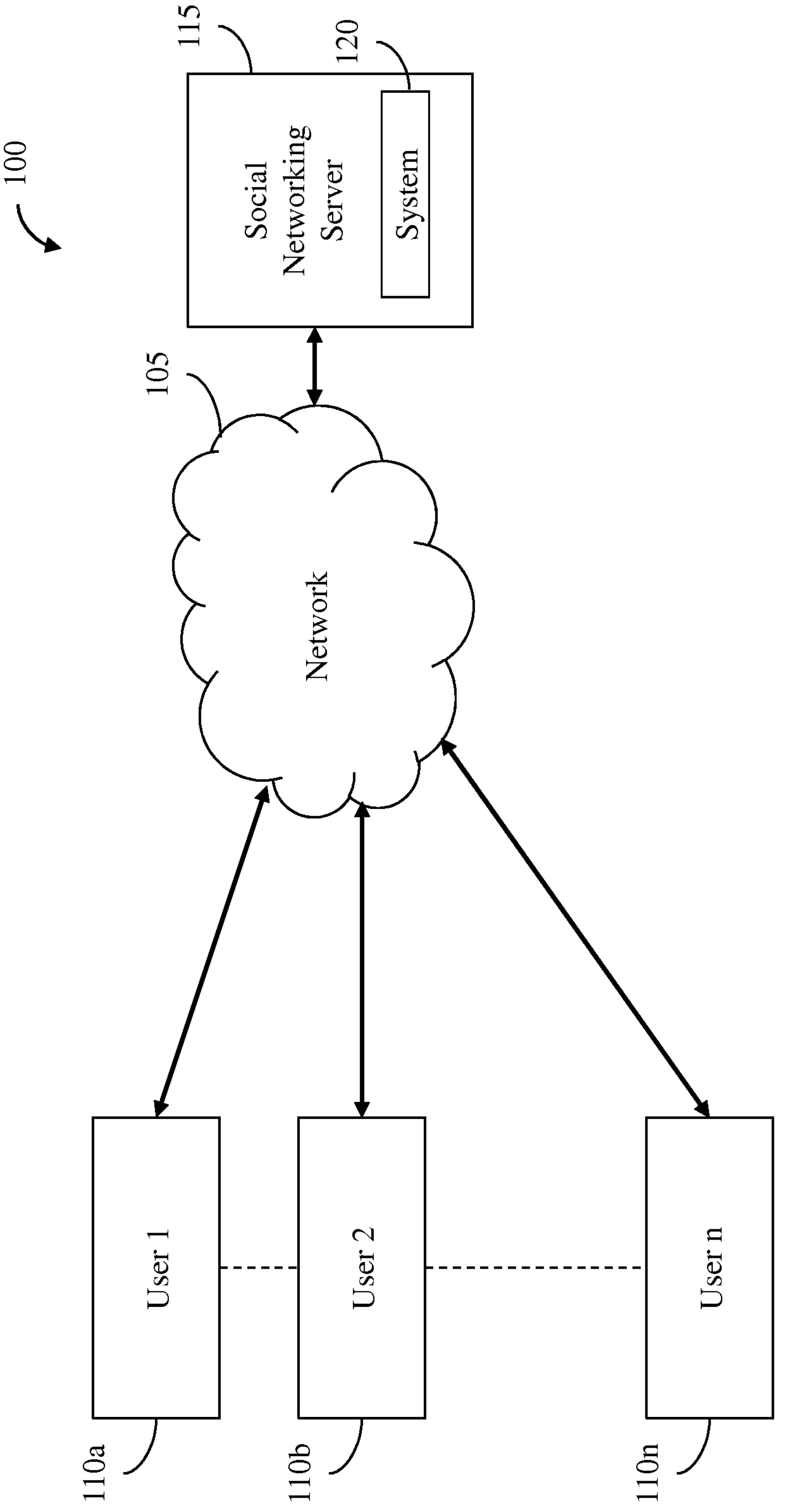
FIG. 1 illustrates a block diagram of an environment to implement a system, in accordance with various embodiments of the present disclosure.

The embodiments have been represented where appropriate by conventional symbols in the drawings, showing only those specific details that are pertinent for understanding the embodiments of the present invention so as not to obscure the disclosure with details that will be readily apparent to those of ordinary skill in the art having the benefit of the description herein.

DETAILED DESCRIPTION OF THE EMBODIMENTS

The present disclosure describes a method, system and computer program product for spreading content in a social network. The following detailed description is intended to provide example implementations to one of ordinary skill in the art, and is not intended to limit the invention to the explicit disclosure, as one or ordinary skill in the art will understand that variations can be substituted that are within the scope of the invention as described.

The social network may be represented by an undirected graph G=(V, E) where 'V' is a set of nodes (hereinafter alternatively be referred to as 'nodes') and 'E' is a set of edges present in the social network. Nodes represent users of the social network and edges are the connections between them. Furthermore, the pieces of content, such as photos, comments, articles and the like, that nodes share with their neighbors over a fixed time period (e.g., a month) may be denoted by 'C'. Each node 'i' in the graph may have the following three parameters: (1) $p_i$, the probability with which node i shares content with its neighbors, (2) $C_i \subset C$, the content generated or discovered by node i, and (3) $\overline{Ni}$, the set of nodes in G compatible with node i. The parameter pi can be empirically estimated by observing the fraction of content that a node shares with its neighboring nodes (hereinafter referred to as 'neighbors') in the graph.

Also, $N_i=\{j: \mathrm{sim}(i,j)>\alpha \Lambda j \epsilon V\}$.

Here sim(i, j) is the similarity between nodes i and j computed based on the number of hops between the nodes, the number of common neighbors, node profiles (such as preferences, educational background and the like), and posted content. A user-defined parameter α ensures that nodes in $N_i$ that are recommended to i are similar to i.

The parameters $c_i$ and $p_i$ determine the flow of content through the network. We define content spread within the social network as:

$\Sigma_c$ Expected number of nodes with content c.

Further, the content spread can vary depending on a content propagation model. The present disclosure computes a set of recommendations 'X' that may be provided to a node (user) of the social network. The set of recommendations 'X' may maximize the content spread. Each recommendation in 'X' is a node pair (i, j), and indicates that node 'i' is recommended to node 'j', and vice versa.

Further, if $P_X(i, c)$ is the probability of content 'c' reaching node 'i' over the edge set $E \cup X$, then the expected number of nodes with content 'c' is given by $\Sigma_i P_X(i,c)$, and the content spread with new edges X is $f(X)=\Sigma_c \Sigma_i P_X(i,c)$. In an embodiment, for a given graph G=(V, E) and a constant k, a content maximization problem may be defined as finding an edge set $X \subseteq \{(i,j): i,j \in V\}$ such that: (1) At most K edges from X are incident on any node in V, (2) For each $(i,j) \in X$, $i \in N_j$ and $j \in N_i$, and (3) f(X) is maximum. Specifically, recommendations 'X' may lead to new connections between existing users and we want to select 'X' so that the overall content flow in the graph is maximized. Further, while creating new links, it may be ensured that each user is suggested at most K new connections (Condition 1, as mentioned above) and that the connection suggestions are between compatible users (Condition 2, as mentioned above).

FIG. 1 illustrates a block diagram of an environment 100, in accordance with various embodiments of the disclosure. The environment 100 includes a network 105, one or more users such as user 1 110*a*, user 2 110*b* . . . to user n 110*n* (hereinafter collectively referred to as "users 110"), a Social Networking Server 115 and a system 120. In one embodiment, the system 120 and the social networking server 115 are processor-based devices that execute source code of a computer program product. The devices can be a personal computer (PC), smart phone, a commercial server or any other processor-based device. In general, the devices may include a persistent memory, non-persistent memory and input/output ports (not shown).

The users 110 may be communicably coupled to the social networking server 115 through the network 105. The social networking server 115 may include an electronic device that may be in electronic communications with the users 110 through the network 105. Further, the social networking server 115 may provide the users 110 an access to a social network. Further, the system 120 may be uploaded on the social networking server 115. In an embodiment, the system 120 may exist individually or on any other web server. The network 105 may include, but is not restricted to, a Local Area Network (LAN), a Wireless Local Area Network (WLAN), a Wide Area Network (WAN), Internet, and a Small Area Network (SAN).

The system 120 may be implemented, on the social networking server 115, to provide recommendations to the users 110 for spreading content in the social network. In an embodiment, the social network may be represented by a Graph (V, E) having a set of nodes 'V' and a set of edges 'E'. Further, each user of the social network may be depicted as a node 'i' that belongs to the set of nodes 'V'. Also, a link between two nodes (users), such as the node 'i' and a node 'j' of the social network, may be represented by an edge of the set of edges 'E'. The 'users 110' may utilize one or more electronic devices to access the network and thereby to access the social networking server 115. Further, in this disclosure, the users 110 may interchangeably be referred as the nodes 'V' for the sake of clarity.

In an embodiment, the user, such as the user 1 110*a*, may need to register with the social networking website that may be provided by the social networking server 115 and may provide information corresponding to the user. Such information may include, but is not restricted to, profile information of the user (hereinafter referred to as the 'user's profile') and interest areas of the user. Further, the user may access the social network by providing his/her authentication details.

Further, the system 120 may provide recommendations to a user, such as the user 1 110*a*, based on, but not limited to, one or more characteristics of the user and probability of content flow through the user. The system 120 may provide one or more recommendations to the user to maximize the content flow through the social network 115. In an embodiment, the recommendations may include, but are not limited to, names and references to other users (such as neighboring users) for assisting the user to connect therewith for increasing the sharing of the content. In another embodiment, the recommendations may include one or more edges (connections/links) that may denote a pair of nodes (users) that may be relevant for maximizing spreading of the content in the social network. Further, the system 120 may be implemented by utilizing a content propagation model. The content propagation model may be understood in conjunction with FIG. 2.

Figure 2:
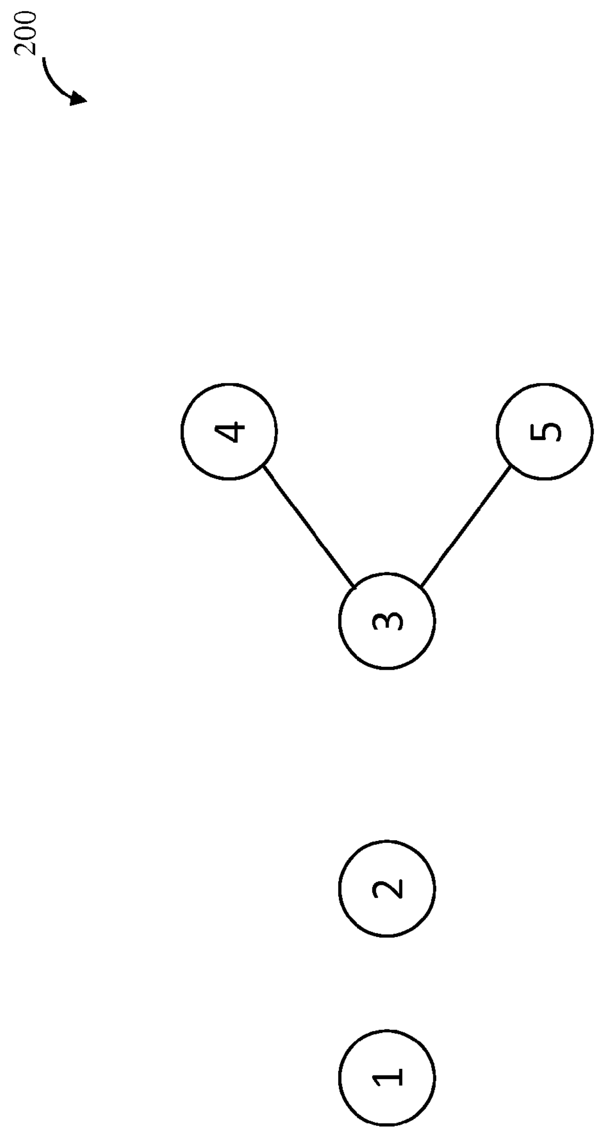
FIG. 2 illustrates an exemplary social network graph for being utilized by a content propagation model in accordance with one embodiment of the present disclosure.

FIG. 2 illustrates an exemplary social network graph 200 for being utilized by a content propagation model in accordance with one embodiment of the present disclosure.

In an embodiment, the propagation model may include Restricted Maximum Probability Path (RMPP) model, hereinafter referred to as 'RMPP' model. The graph 200 depicts nodes, such as a node 1, node 2, node 3, node 4, and node 5, and edges, such an edge (3,4) and an edge (3,5). Each edge is in form of a pair (i,j) that may depict a link between 'i' and 'j'. Here, 'i' and 'j' depict the nodes of the graph. Further, the link between 'i' and 'j' may be referred to as a path for content flow between node i and node j. For example, for the edge (3,4), i='3' and j='4'. Further, the edge (3,4) depicts a link (or path for content flow between node 3 and node 4) between node 3 and node 4. Similarly, the edge (3,5) shows a link (path for content flow) between node 3 and node 5.

Let each node in the graph 200 have a propagation probability '1' for propagating a piece of content from one node to another in the graph 200. Further, let only node 1 contain a single piece of content c. The content spread for $S=\phi$, $T=\{(2, 3)\}$ and $e=(1, 2)$ may be computed in the RMPP model. Here, 'S', 'T' and 'e' may be edge sets corresponding to the graph 200. Further, the content spread is '0' for edge sets 'S' and 'T' since there are no edges for 'S' and 'T' that are connected to node 1. Also, for edge set $S \cup \{e\}$, the content spread is '2' because content c reaches node 2 with probability 1 along path (1, 2).

Further, the content spread for edge set $T \cup \{e\}$ is also 2 because the content c from node 1 can only reach node 2. In this, the content cannot reach other nodes, in the graph 200, as this would require the content to traverse a path containing both edges in $T \cup \{e\}$ which is not allowed. Thus in RMPP model, $f(S \cup \{e\})-f(S) >= f(T \cup \{e\})-f(T)$.

Further, this (content spread in RMPP model) is in contrast to other models, such as Maximum Probability Path (MPP) and Independent Cascade (IC) models under which:

$$f(S \cup \{e\})-f(S) < f(T \cup \{e\})-f(T).$$

The content spread in the RMPP model can also be efficiently computed. Further, for RMPP model, the present disclosure may compute the probability $P_X(i,c)$ of content c getting to node i for a new edge set X as follows.

Let V (c) denote the nodes containing content c. Further, for $j \in V(c)$, let $q_X(j, i)$ may be the probability of the path $RMPP_X(i,j)$ from j to i if it is above threshold value 'θ'. Further, if the probability of path $RMPP_X(i,j)$ is less than θ, then $q_X(i,j)=0$. As the propagation of content to node i along the individual paths $RMPP_X(i,j)$ are independent, the probability $P_X(i,j)=1-\pi_{j \in V}(c)(1-q_X(j,i))$.

Thus, the content spread function in the RMPP model may be given by:

$$f(x)=\Sigma c \Sigma i P_X(i,c)=\Sigma c \Sigma i(1-\pi j \in V(c)(1-q_X(j,i))) \quad (1)$$

Thus, the content maximization problem in the RMPP model may include finding an edge set 'X' in graph G that maximizes the content spread f(X) in Equation (1) above subject to constraints as follows: (1) At most K edges from X are incident on any node in V, (2) For each $(i,j) \in X$, $i \in N_j$ and $j \in N_i$, and (3) f(X) is maximum.

Further, for example in the social graph of FIG. 2 if the propagation probabilities for all nodes be '1/2'. Furthermore, if node 1 contains content 'c' and nodes 4 and 5 contain content c'. Finally, if 'X'={(1, 2), (2, 3)}. Now, $P_X(2, c)=p_1=1/2$ since c can flow from node 1 to node 2 along path (1, 2). However, $P_X(j, c)=0$ for $j \geq 3$ since there is no path from node 1 to j containing at most one edge from X. Content c' can reach node 3 from node 4 and node 5 along two paths (4, 3) and (5, 3) respectively. Thus, $P_X(3, c')=1-(1-p_4)(1-p_5)=3/4$. Similarly, since content c' can reach node 2 along paths (4, 3, 2) and (5, 3, 2). We get $P_X(2, c')=1-(1-p_4 \cdot p_3)(1-p_5 \cdot p_3)=7/16$. However, content c' may not reach node 1 because paths to 1 from node 4 and node 5 involve two edges from X. Thus, content spread $f(X)=\Sigma i P_X(i,c)+\Sigma i P_X(i,c')=(1+1/2)+(2+3/4+7/16)=4.6875$.

Further, it may be appreciated by any person skilled in the art that the content propagation model for content spreading is not restricted to RMPP model. The present disclosure may utilize many other models for content propagation such as MPP, IC and the like.

Figure 3:
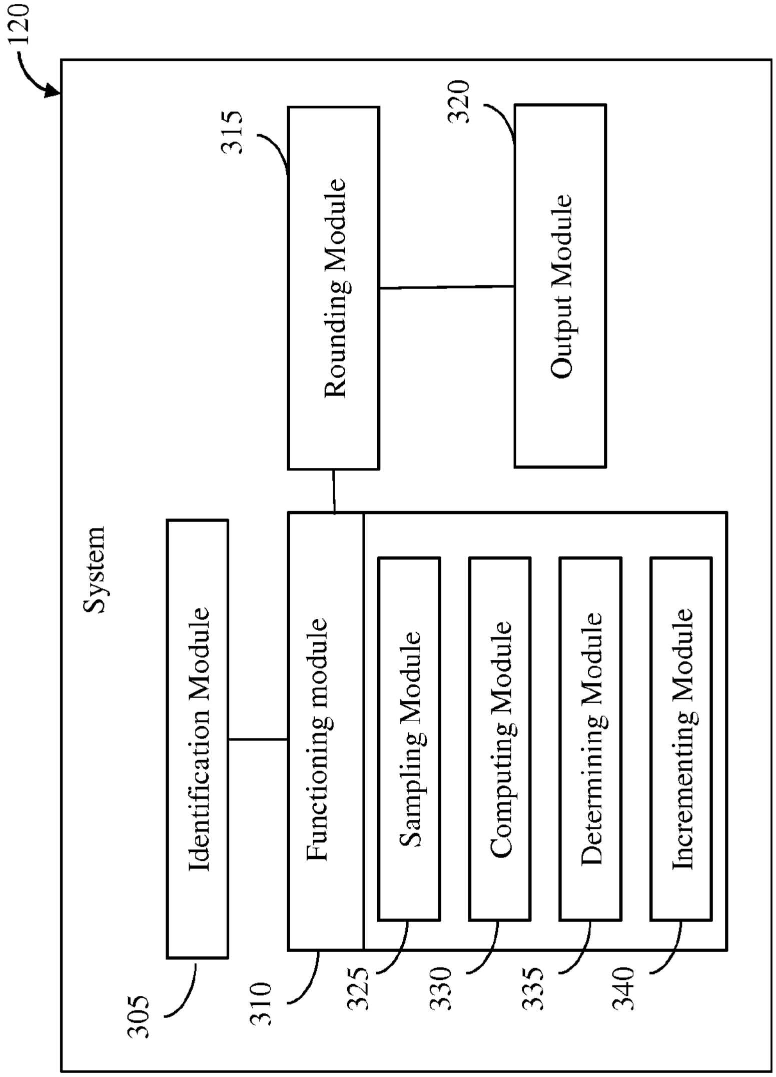
FIG. 3 illustrates block diagrams of a system, such as the system 120, to maximize spreading of content in a social network, in accordance with an embodiment of the present disclosure.

FIG. 3 illustrates block diagrams of a system, such as the system 120, to maximize spreading of content in a social network, in accordance with an embodiment of the present disclosure.

In an embodiment, the system 120 is an online system that may be utilized through a social networking server, such as the social networking server 115. In another embodiment, the system 120 may be embedded in the social networking server 115 to provide recommendations to users, such as the users 110. The system 120 may be utilized for a social network that may be represented by a Graph G having a set of nodes 'V' and a set of edges 'E'. Each edge may represent a path between two nodes. In an embodiment, the system 120 may utilize a Restricted Maximum Probability Path (RMPP) model. In this model, for a path $(i=u_1, u_2 \ldots u_r=j)$ through nodes $u_1, u_2, \ldots, u_r$, a propagation probability of a path may be defined as: $p_{u1}, p_{u2}, p_{u3}, \ldots, p_{ur-1}$. This is essentially the probability that content from node i reaches node j along the path (edge) in a social network.

As shown in FIG. 3, the system may include an identification module 305, a functioning module 310 communicably coupled to the identification module 305, a rounding module 315 communicably coupled to the functioning module 310, and an output module 320 communicably coupled to the rounding module 315.

The identification module 305 may identify initial candidates set of edges including candidate edges for a node in a graph of the social network. The initial candidate set may be identified based on one or more characteristics corresponding to the node. For each user u (or a node), the system 120 may identify a candidate set $N_u$ of similar users based on the characteristics such as number of common neighbors, proximity in the social graph, similarity of profiles and posted content, etc. the candidate set may be utilized by the functioning module 310.

The functioning module 310 may perform one or more functionalities to determine a subset of edges $\bar{y}$ relevant for maximizing flow of the content in the social network. The one or more functionalities may be performed for a specific number of iterations. Further, the functioning module 310 may include a sampling module 325, a computing module 330, a determining module 335, and an incrementing module 340. The sampling module 325 may generate one or more samples of edges from the initial candidate set of edges. The initial candidate set of edges being the edges between similar users. Each edge having a probability value for content flow through that edge. For example, the system 120 may generate 'r' samples $X_1, X_2, \ldots, X_r$, where $e_i \in X_j$ with probability $y_i$. $y_i$ denotes the probability of the edge $e_i$. The probability value '$y_i$' for each edge of the one or more samples of edges may be a value between '0' and '1'. Further, the probability value may be initialized to zero ('0').

Further, the computing module 330 may compute gain corresponding to each edge of the one or more samples of edges. Weight gain of each edge may be denoted by $w_i$ and $w_i=(\Sigma j f(X_j \cup e_i)-f(X_j))/r$.

Here, 'r' is a number of samples, and the term "$\Sigma_j f(X_j \cup e_i)-f(X_j)$" may provide a marginal gain of each edge $e_i$. Further, $f(X_j)$ may be computed as a content spread function as follows:

$$f(X)=\Sigma c \Sigma i P_X(i,c)=\Sigma c \Sigma i (1-\pi j \in V(c)(1-q_X(j,i))).$$

The function may be understood more clearly when read in conjunction with explanation of FIG. 2. Further, $q_x(i,j)$ may be determined by utilizing using Dijkstra's shortest path algorithm. This is explained further in conjunction with description of FIG. 4.

Further, based on the computed gain (by computing module 330), the determining module 235 may determine the subset of edges 'Y' from the one or more samples of edges. Such that no node has more than 'K' incident edges and $\Sigma e_i \in y w i$ is maximum. Here, 'K' is a pre-defined number of incoming edges for each node in the subset of edges. This is an instance of the graph matching problem and may be solved by utilizing various algorithms such as bipartite maximum weight b-matching. In one example, given the graph G=(V, E), a matching M represents a set of edges. The matching M represents the set of edges such that no edge shares a common node. The matching M' is a matching of the graph G. Further, the matching M exhibits a property such that if an edge (that is not in M') is added, then M' is no longer the matching edge of the graph G. Polynomial time algorithms, in one example, an Edmond's matching algorithm may be utilized for finding the matching edge of the graph G=(V, E).

$$\text{Thus, } \Sigma j \in e_i y_i \leq K \text{ for all } j \in V \tag{2}$$

$$y_i \in [0,1] \tag{3}$$

Here, equation (2) may enforce the constraint that each node 'j' has at most 'K' incident edges in the discrete case. Now, let $F(\bar{y}_{opt})$ be the maximum value of $F(\bar{y})$ subject to the constraints, and $X_{opt}$ be the edge set satisfying constraints for which $f(X_{opt})$ is maximum. Also, let $\bar{z}$ be defined as follows: $z_i=1$ if $e_i \in X_{opt}$, and '0' otherwise. Then, observe that $\bar{F}(\bar{z})=f(X_{opt})$, and $\bar{z}$ is feasible. Thus, we have that $F(\bar{y}_{opt}) \geq F(\bar{z}) \geq f(X_{opt})$.

The incrementing module 340 may increment the probability value of each edge of the subset of edges by a predefined value. The probability value of each edge of the subset of edges being incremented to upgrade the determined subset of edges. The incrementing module 340 may consider 'δ' intervals of width 1/δ. Further, in each iteration, it increments $y_i$ values of edges $e_i$ in a feasible edge set 'Y' with the maximum sum of gradients $\Sigma e_i \in Y \partial F/\partial y_i$. Each gradient $\partial F/\partial y_i$ may be approximated as $E[f(X \cup e_i)-f(X)]$ that may be estimated by averaging over r samples $X_j$. The graph matching algorithm may then be used to compute the optimal set Y with at most k edges per node and the maximum sum of gradient estimates. Further, as the $y_i$ values of only edges $e_i \in Y$ are incremented by $1/\delta$ in each iteration, the final $\bar{y}$ satisfies Equation (4).

Further, the rounding module 315 is communicably connected to the functioning module 310. The rounding module 315 may be configured to determine a final set of edges 'X' from the upgraded subset of edges. The final set of edges 'X' being determined by ensuring 'K' incoming edges for each node of the upgraded set of edges. Further, the rounding module 315 may perform partitioning of the final set of edges 'X' into one or more sets $X_i$ of edges. Also, one or more incoming edges for the each node from $X_i$ may be removed when a number of the incoming edges for the each node of $X_i$ is greater than 'K' incoming edges.

In an exemplary embodiment, after computing satisfying $\Sigma j \in e_i y_i \leq k$ for all $j \in V$ and $F(\bar{y}) \geq (1-1/e) \cdot f(X_{opt})$, randomized rounding process may be utilized to compute the final set X of edges. Essentially, an element $e_i$ may be added to X with probability $y_i$ As $E[f(X)]=F(\bar{y})$ and so $E[f(X)]\ (1-1/e) \cdot f(X_{opt})$. However, in an embodiment, the result of rounding X may no longer be feasible, that is, the number of edges in X that are incident on a node j may exceed 'K'. So we need to delete edges from X to ensure that it is feasible. This may be done by partitioning X into a small number of feasible sets $X_i$ and returning the $X_i$ for which $f(X_i)$ is maximum. The partitioning scheme starts with $X_1=X$ and for each node j with K'>K incident edges in $X_1$, the rounding module 315 may delete K'−K edges incident on j from $X_1$ and inserts them into a new (overflow) set $X_2$. Thus, $X_1$ may become feasible, and the procedure may be repeated for $X_2, \ldots, X_s$ until an overflow set $X_s$, that is feasible, is obtained.

Further, the output module 320, of the system 120, may output the final set of edges 'X' to facilitate spreading of the content in the social network. The final set 'X' may provide relevant recommendations (edges) to the users (nodes) that may assist users in connecting with nodes corresponding to the relevant recommendations for increasing content spread in the network.

It may be appreciated by any person skilled in the art that the above description of various functional modules may include main embodiments of the present inventions. Further, there may be other embodiments and functional modules that may be suitable for the subject matter and may be implemented in light of the description present in this disclosure. Also, various modules of the system 120 may be understood more clearly when read in conjunction with FIG. 4.

Figure 4:
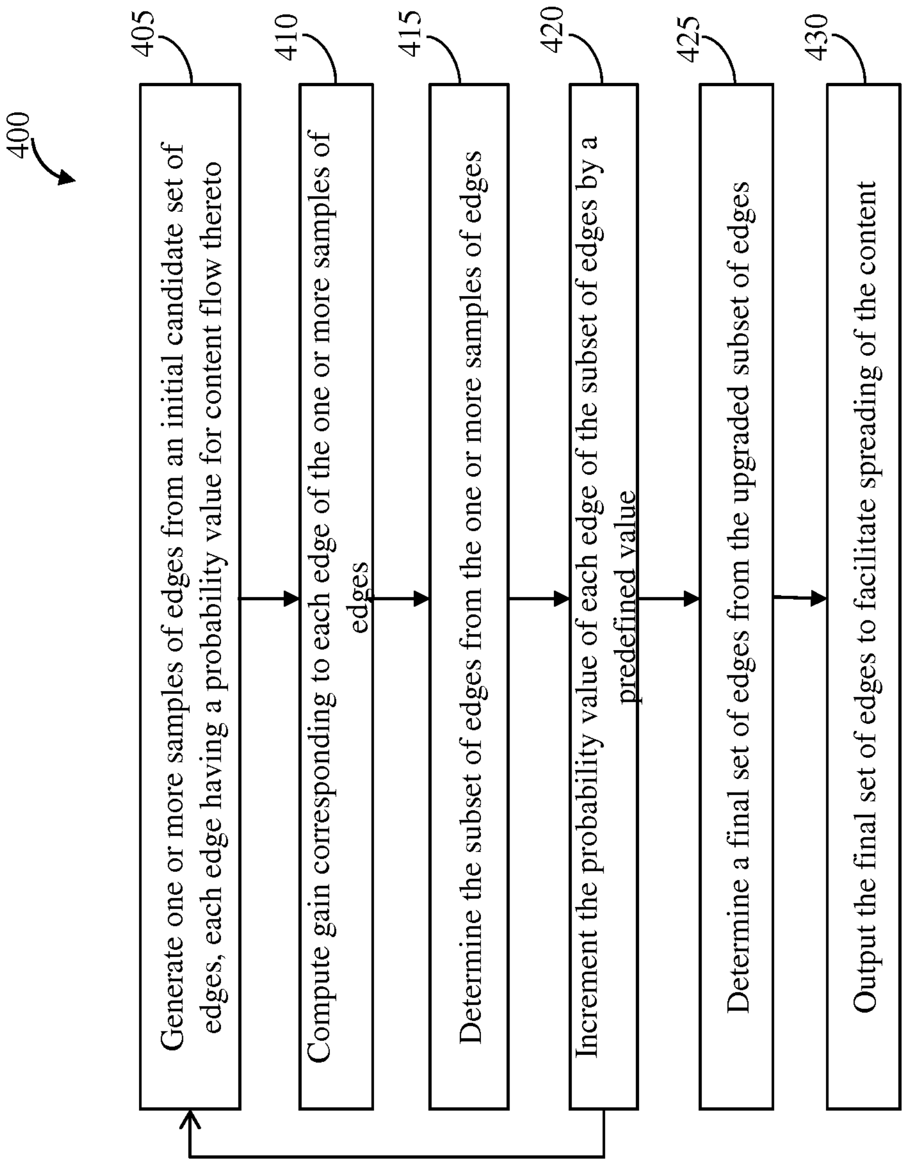
FIG. 4 is a flowchart illustrating method for maximizing content spread in a social network, in accordance with an embodiment of the present disclosure.

FIG. 4 is a flowchart illustrating method 400 for maximizing content spread in a social network, in accordance with an embodiment of the present disclosure. The content maximization in a graph G=(V, E) of the social network may be defined as finding an edge set $X \subset \{(i,j): i,j \in V\}$ such that: (1) At most K edges from X are incident on any node in V, (2) For each $(i,j) \in X$, $i \in N_j$ and $j \in N_i$, and (3) f(X) is maximum. The order and number of steps in which the method 400 is described is not intended to be construed as a limitation.

At step 405, one or more samples of edges from an initial candidate set of edges are generated. The initial candidate set of edges being the edges between similar users. The initial candidate set may be identified based on one or more characteristics corresponding to the node. The characteristics may include, but are not restricted to, similar users based on number of common neighbors, proximity in the social graph, and similarity of profiles and posted content. Let $Z=\{e_1, e_2, \ldots, e_m\}$ be the candidate set of edges between similar nodes in V corresponding to compatible users.

At step 410, gain corresponding to each edge of the one or more samples of edges is computed. To compute gain, $q_X(i,j)$ may be computed by utilizing Dijkstra's algorithm to find shortest path between nodes. A fast procedure to compute maximum probability paths between nodes containing at most one edge from edge set X. Following algorithm describes an $O((|E|+|X|) \cdot \log |V|)$ procedure for computing the probabilities $q_X(j, i)$ of the RMPPs between nodes j and i. Probabilities $q_X(j,i)$ may be computed by utilizing following algorithm (hereinafter referred to as 'Algorithm 1') to compute RMPP from node j to i.

1. Foreach $j \in V$ do $w_j = -\log p_j$ ;
2. $Do(((V, E, \{w_j\}), i) = DijkstraShortestPath((V, E, \{w_j\}), i)$;
3. foreach $j \in V$ do $D_1(j) = D_0(j)$;
4. $S = \phi$;
5. while S ! = V do
6. $j = \operatorname{argmin}_{l \in V-S} D_1(l)$;
7. $S = S \cup \{j\}$;
8. foreach $(j, l) \in (E \in X)$ such that l does not belong to S, do
9. If $(j, l) \in E$ then
10. $D_1(l) = \min\{D_1(l), D_1(j) + w_1\}$;
11. else if $(j, l) \in X$ then
12. $D_1(l) = \min\{D_1(l), D_0(j) + w_1\}$;
13. foreach $j \in V$ do $q_X(j, i) = 2^{-D1(j)}$;
14. return $\{q_X(j, i)\}$;

In above algorithm, the maximum probability path computation problem may be transformed to one of computing minimum weight paths by assigning a weight $w_j=-\log p_j$ to each node j with propagation probability $p_j$. Now, let $D_0(j)$ denote the weight of the shortest path from j to i containing 0 edges from X, that is, containing edges from only E. It may be appreciated by any person skilled in the art that $D_0(j)$ for nodes j can be computed efficiently using Dijkstra's shortest path algorithm. Here, an undirected graph with node weights may be converted into a directed graph with edge weights by replacing each undirected edge (j, l) with two directed edges: (j, l) with weight $w_1$ and (l, j) with weight $w_j$. The weight of the shortest path from i to j in the directed graph is then equal to $D_0(j)$.) Further, $D_0(j)$ may be used to compute the weight of the shortest path from j to i containing at most one edge from X. This weight may be denoted by $D_1(j)$. As $D_1(j) \leq D_0$, the process may be started by initializing each $D_1(j)$ to $D_0(j)$. Then, similar to Dijkstra's algorithm, nodes j may be considered in increasing order of $D_1(j)$. Further, the nodes j may be added to set S in successive iterations.

Further, in each iteration, $D_1(l)$ for the next node l, to be added to S, may be equal to either (1) $D_1(j)+w_1$ for some $j \in S$ and edge $(j,l) \in E$, or (2) $D_0\ (j)+w_1$ for some $j \in S$ and edge $(j,l) \in X$. Thus, it may be ensured that the value of $D_1(l)$ is computed correctly by updating it, as described in steps 9-12 of Algorithm 1 every time a node j is added to S. After computing all the $D_1(j)$ path weights, the RMPP probability for each j is simply equal to $2-D_1(j)$. In an embodiment, threshold $\theta$ may also be utilized by not expanding paths further if their weight exceeds $-\log \theta$. This may be implemented by essentially not adding any further nodes to set S once $D_1(j)$ for a node $j \in S$ exceeds $-\log \theta$.

Again at step 410, the gain may be computed by utilizing $q_X(i,j)$ as computed above through algorithm 1. further, the gain may be computed by $$w_i=(P_j f(X_j e_i)-f(X_j))/r.$$

Here, $f(X_j)$ may be computed by: $f(X)=\Sigma c \Sigma i P_X(i,c)=\Sigma c \Sigma i(1-\pi j \in V(c)(1-q_X(j,i)))$, as explained above in conjunction with FIG. 3.

At step 415, the subset of edges from the one or more samples of edges may be determined based on the computed gain. The subset of edges may be determined in a way such that no node has more than 'K' incident edges and $\Sigma e_i \epsilon Y w_i$ is maximum. Here, 'K' is a pre-defined number of incoming edges for each node in the subset of edges. Further, the subset of edges may be determined by considering subset finding as an instance of graph matching problem. Thus, it may be solved by utilizing various algorithms corresponding to graph matching problem such as bipartite maximum weight b-matching.

Thus, $\Sigma j \epsilon e_i y_i \leq K$ for all $j \epsilon V$ (as explained earlier in conjunction with FIG. 2). This equation may enforce the constraint that each node 'j' has at most 'K' incident edges in the discrete case. Now, let $F(\bar{y}_{opt})$ be the maximum value of $F(\bar{y})$ subject to the constraints, and $X_{opt}$ be the edge set satisfying constraints for which $f(X_{opt})$ is maximum.

At step 420, the probability value of each edge of the subset of edges may be incremented by a predefined value. The probability value of each edge of the subset of edges is incremented to upgrade the determined subset of edges.

Further, at step 425, a final set of edges from the upgraded subset of edges may be determined. The final set of edges 'X' being determined by ensuring 'K' incoming edges for each node of the upgraded set of edges. Once we have computed the subset of edges, $\bar{y}$ satisfying $\Sigma j \epsilon e_i y_i \leq K$ for all $j \epsilon V$ and $F(\bar{y}) \geq (1-1/e) f(X_{opt})$. In an embodiment, randomized rounding technique may be utilized to compute the final set X of edges. The randomized rounding may be performed by partitioning of the final set of edges 'X' into one or more sets '$X_i$' of edges. Also, one or more incoming edges for the each node from $X_i$ may be removed when a number of the incoming edges for the each node of $X_i$ is greater than 'K' incoming edges The final set of edges may be outputted to the users at step 430. The final set of edges may provide recommendations to the users to facilitate the users in maximizing the content spread.

Further, the method 400 may be understood with the help of following algorithm (hereinafter referred to as 'approximation algorithm') for calculating the subset of edges.

The approximation algorithm may be utilized to calculate the subset of edges $\bar{y}$ relevant for content spreading in a social network. The social network may be represented by a Graph G=(V,E), candidate edges Z. further, the output of implementing the algorithm 2 may include:

$$F(\bar{y}) \geq (1 - 1/e) \cdot f(X_{opt});$$

1 $\bar{y} = 0; l = 0;$
2 while $l < \delta$ do
3 Generate r samples $X_1, X_2, \ldots, X_r$, where $e_i$ $X_j$ with probability $y_i$. Set $w_i = (P_j (X_j\ e_i) - f(X_j))/r$
4 Compute a subset of edges Y such that no node has more than k incident edges and $e_i \in Y$ wi is maximum.;
5 foreach $e_i \in Y$ do $y_i = y_i + 1/\delta$;
6 $l = l + 1$;
7 return $\bar{y}$;

The step '4' above shows an instance of the graph matching problem and may be solved using the algorithm corresponding thereto.

Further, after determining subset of edges $\bar{y}$, final set of edges may be determined as explained earlier. Further, in an embodiment, the following theorem may be proved. According to this theorem, For $\delta = m_2$ and $r = m_5$, Algorithm 2 returns $\bar{y}$ satisfying Equation (4) and $F(\bar{y}) \geq (1-1/e) * f(X_{opt})$.

Analysis of Approximation Algorithm.

In an embodiment, the present disclosure may show following approximation guarantee for the approximation algorithm:

Theorem A: Let $|V| = n$, $\delta = m^2$ and $r = m^5$. Further, let our partitioning scheme generate edge sets $X_1, \ldots, X_s$. Then w.h.p. $E[\max i\ f(X_i)] \geq 1/(3 + 2 \cdot (1 - 1/e) \cdot f(X_{opt})$, where $$= \sqrt{\frac{8}{k}(\log(n)}$$

It is to be noted that 'Theorem A' provides worst-case bounds. In practice, experimental results indicate that the approximation algorithm may return edge sets with good content spreads for much smaller values of parameters δ (set to 2000) and r (set to 30). The time complexity of our approximation algorithm may be dominated by the matching procedure in Step 3 of the Approximation Algorithm (as shown above). The matching algorithm may have time complexity $O(m_3)$ and is run δ times. Thus, the overall time complexity of our approximation algorithm is $O(m_3 \cdot \delta)$.

In an embodiment, to overcome the computation cost, for large m, the edges in Z may be clustered and run Approximation Algorithm on smaller clusters. To achieve further speedup, an approximate matching may be utilized based on greedy heuristics instead of exact matching.

The present disclosure as described above has numerous advantages. Based on the aforementioned explanation, it can be concluded that the present disclosure may recommend connections in a social network with the explicit objective of maximizing content spread in the network. Advantageously, such content maximization problem is NP-hard and non-submodular. The absence of sub-modularity arises from the fact that the graph structure dynamically changes as new recommendations get accepted by users, when the recommendations are provided to the users. Also, the present disclosure imposes per-node constraints on the maximum number of new links as opposed to a global constraint on the number of selected nodes as in the influence maximization problem. Further, the present disclosure has proposed a novel RMPP model that admits submodularity leading to computationally feasible approximation algorithms in the presence of constraints (as mentioned earlier in this disclosure). Simulation results on realistic graphs may demonstrate the superiority of our approach in comparison with commonly accepted heuristics.

Furthermore, certain aspects may further be investigated. Although the present disclosure considers the uniform and weighted models for propagation, many other diffusion models (such as SIS diffusion model) could be considered. Also, it may be appreciated by any person skilled in the art that subject matter of the present disclosure may further include improving scalability and measuring the effectiveness of various algorithms, (such as, but not limited to, as explained above), on a live web-scale network.

The present invention may also be embodied in a computer program product for spreading content in a social network. The computer program product may include a non-transitory computer usable medium having a set program instructions comprising a program code for determining a final set of edges to provide recommendations to users of the social network. The set of instructions may include various commands that instruct the processing machine to perform specific tasks such as tasks corresponding to determining subset of edges by satisfying one or more constraints such as for each node of the subset of edges, number of incoming edges should be less than or equal to some pre-defined number 'K'. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A method for maximizing content spread in a social network, the social network comprising a set of nodes and a set of edges between one or more nodes of the set of nodes, the method operated by a social networking server of the social network, and comprising:

executing steps (a) to (d) for performing one or more functionalities to determine a subset of edges relevant for maximizing flow of a content in the social network, the steps (a) to (d) executed by the social networking server and comprising:

(a) generating one or more samples of edges from an initial candidate set of edges, each edge acquiring a probability value for content flow thereto;

(b) computing gain corresponding to each edge of the one or more samples of edges;

(c) determining the subset of edges from the one or more samples of edges, the subset of edges being determined based on the computed gain, each node corresponding to each edge of the subset of edges having at least one of less than 'K' incoming edges and equal to 'K' incoming edges; and (d) incrementing the probability value of each edge of the subset of edges by a predefined value, the probability value of each edge of the subset of edges being incremented to upgrade the determined subset of edges, wherein the steps (a) to (d) being performed for a predefined number of iterations;

determining a final set of edges 'X' from the upgraded subset of edges, the final set of edges 'X' being determined by ensuring 'K' incoming edges for each node of the upgraded set of edges; and outputting the final set of edges 'X' as recommendations to users to maximize spreading of the content in the social network so that a user will find content which is available over the edges of the final set of edges, and which is novel to the user and is diverse.

2. The method of claim 1, wherein each node of the set of nodes corresponding to a user of the social network.

3. The method of claim 1, wherein each edge of the set of edges corresponding to a connection between two users of the social network.

4. The method of claim 1 further comprising identifying the initial candidate set of edges comprising candidate edges for a node, the initial candidate set being identified based on one or more characteristics corresponding to the node.

5. The method of claim 1, wherein the probability value for each edge is initialized as '0'.

6. The method of claim 1, wherein determining the subset of edges from the one or more samples of edges comprising determining one or more edges having maximum total gain.

7. The method of claim 1, wherein 'K' is a predefined number of incoming edges for the each node in the subset of edges.

8. The method of claim 1, wherein determining the final set of edges 'X' further comprising:

partitioning the final set of edges 'X' into one or more sets '$X_i$' of edges; and removing one or more incoming edges for the each node from $X_i$, the one or more incoming edges being removed when a number of the incoming edges for the each node of $X_i$ is greater than 'K' incoming edges.

9. The method of claim 1 further comprising computing a maximum probability edge from the initial candidate set of edges, the computed maximum probability edge being utilized in computing the gain corresponding to each edge of the one or more samples of edges.

10. The method of claim 1, wherein the probability value for the each edge of the one or more samples of edges is one of '0' and '1'.

11. A system for maximizing content spread in a social network, the social network comprising a set of nodes and a set of edges between one or more nodes of the set of nodes, the system operated by a social networking server of the social network, and comprising:

a processor-based electronic device which executes computer program code implemented as:

a functioning module configured to perform one or more functionalities to determine a subset of edges relevant for maximizing flow of a content in the social network, the functioning module comprising:

(a) a sampling module for generating one or more samples of edges from an initial candidate set of edges, each edge having a probability value for content flow thereto;

(b) a computing module for computing gain corresponding to each edge of the one or more samples of edges;

(c) a determining module configured to determine the subset of edges from the one or more samples of edges, the subset of edges being determined based on the computed gain, each node corresponding to each edge of the subset of edges having at least one of less than 'K' incoming edges and equal to 'K' incoming edges; and (d) an incrementing module configured to increment the probability value of each edge of the subset of edges by a predefined value, the probability value of each edge of the subset of edges being incremented to upgrade the determined subset of edges, wherein the functioning module performs one or more functionalities for a predefined number of iterations;

a rounding module configured to determine a final set of edges 'X' from the upgraded subset of edges, the final set of edges 'X' being determined by ensuring 'K' incoming edges for each node of the upgraded set of edges; and an output module configured to output the final set of edges 'X' as recommendations to users to maximize spreading of the content in the social network so that a user will find content which is available over the edges of the final set of edges, and which is novel to the user and is diverse.

12. The system of claim 11, wherein each node of the set of nodes corresponding to a user of the social network.

13. The system of claim 11, wherein each edge of the set of edges corresponding to a connection between two users of the social network.

14. The system of claim 11 further comprising an identification module for identifying the initial candidate set of edges comprising candidate edges for a node, the initial candidate set being identified based on one or more characteristics corresponding to the node.

15. The system of claim 11, wherein the probability value for each edge is initialized as '0'.

16. The system of claim 11, wherein the determining module capable of determining the subset of edges from the one or more samples of edges when total gain for the subset of edges is maximum.

17. The system of claim 11, wherein 'K' is a predefined number of incoming edges for the each node in the subset of edges.

18. The system of claim 11, wherein the rounding module further configured to:

perform partitioning of the final set of edges 'X' into one or more sets '$X_i$' of edges; and remove one or more incoming edges for the each node from $X_i$, the one or more incoming edges being removed when a number of the incoming edges for the each node of $X_i$ is greater than 'K' incoming edges.

19. The system of claim 11, wherein the computing module further configured to compute a maximum probability edge from the initial candidate set of edges, the computed maximum probability edge being utilized in computing the gain corresponding to each edge of the one or more samples of edges.

20. The system of claim 11, wherein the probability value for the each edge is one of '0' and '1'.

21. A computer program product for use with a computer-implemented social network server, the computer program product comprising a non-transitory computer usable medium having a computer readable program code embodied therein for maximizing content spread in a social network, the computer readable program code when executed by the social network server performing a method comprising:

executing steps (a) to (d) for performing one or more functionalities to determine a subset of edges relevant for maximizing flow of a content in the social network, the steps (a) to (d) comprising:

(a) generating one or more samples of edges from an initial candidate set of edges, each edge acquiring a probability value for content flow thereto;

(b) computing gain corresponding to each edge of the one or more samples of edges;

(c) determining the subset of edges from the one or more samples of edges, the subset of edges being determined based on the computed gain, each node corresponding to each edge of the subset of edges having at least one of less than 'K' incoming edges and equal to 'K' incoming edges; and (d) incrementing the probability value of each edge of the subset of edges by a predefined value, the probability value of each edge of the subset of edges being incremented to upgrade the determined subset of edges, wherein the steps (a) to (d) being performed for a predefined number of iterations;

determining a final set of edges 'X' from the upgraded subset of edges, the final set of edges 'X' being determined by ensuring 'K' incoming edges for each node of the upgraded set of edges; and outputting the final set of edges 'X' as recommendations to users to maximize spreading of the content in the social network so that a user will find content which is available over the edges of the final set of edges, and which is novel to the user and is diverse.

22. The computer program product of claim 21, wherein each node of the set of nodes corresponding to a user of the social network.

23. The computer program product of claim 21, wherein each edge of the set of edges corresponding to a connection between two users of the social network.

24. The computer program product of claim 21, wherein the computer program code further identifies the initial candidate set of edges comprising candidate edges for a node, the initial candidate set being identified based on one or more characteristics corresponding to the node.

25. The computer program product of claim 21, wherein the probability value for each edge is initialized as '0'.

26. The computer program product of claim 21, wherein determining the subset of edges from the one or more samples of edges comprising determining one or more edges having maximum total gain.

27. The computer program product of claim 21, wherein 'K' is a predefined number of incoming edges for the each node in the subset of edges.

28. The computer program product of claim 21, wherein determining the final set of edges 'X' comprising:

partitioning the final set of edges 'X' into one or more sets $X_i$ of edges; and removing one or more incoming edges for the each node from $X_i$, the one or more incoming edges being removed when a number of the incoming edges for the each node of $X_i$ is greater than 'K' incoming edges.

29. The computer program product of claim 21, wherein the computer program code further computes a maximum probability edge from the initial candidate set of edges, the computed maximum probability edge being utilized in computing the gain corresponding to each edge of the one or more samples of edges.

30. The computer program product of claim 21, wherein the probability value for the each edge of the one or more samples of edges is one of '0' and '1'.

31. A method for maximizing content spread in a social network, the social network comprising a set of nodes and a set of edges between one or more nodes of the set of nodes, the method operated by a social networking server of the social network, and comprising:

determining a subset of the set of edges, the subset of edges being relevant for maximizing flow of a content in the social network; and recommending the subset of edges to the nodes, by disseminating the subset of edges over the social network to the set of nodes;

whereby the nodes may send content, which is novel to the user and is diverse, to other nodes through the social network based on the subset of edges, the content being novel to the other nodes and being diverse, thereby maximizing the flow of the content in the social network.

32. A computer-implemented system for maximizing content spread in a social network, the social network comprising a set of nodes and a set of edges between one or more nodes of the set of nodes, the system operated by a social networking server of the social network, and comprising:

a processor-based electronic device which executes computer program code implemented as:

a functioning module operable responsive to computer program code for determining a subset of the set of edges, the subset of edges being relevant for maximizing flow of a content in the social network; and a functioning module operable responsive to computer program code for recommending the subset of edges to the nodes, by disseminating the subset of edges over the social network to the set of nodes;

whereby the nodes may send content to other nodes through the social network based on the subset of edges, the content being novel to the other nodes and being diverse, thereby maximizing the flow of the content in the social network.

33. A computer program product, for use with a computer-implemented social network server, the computer program product comprising a non-transitory computer usable medium having computer readable program code embodied therein for maximizing content spread in a social network, the social network comprising a set of nodes and a set of edges between one or more nodes of the set of nodes, the computer readable program code when executed by the social network server performing a method comprising:

determining a subset of the set of edges, the subset of edges being relevant for maximizing flow of a content in the social network; and recommending the subset of edges to the nodes, by disseminating the subset of edges over the social network to the set of nodes;

whereby the nodes may send content to other nodes through the social network based on the subset of edges, the content being novel to the other nodes and being diverse, thereby maximizing the flow of the content in the social network.

* * * * *